(12) United States Patent
Diez Herrera et al.

(10) Patent No.: US 9,080,588 B2
(45) Date of Patent: Jul. 14, 2015

(54) QUICK FASTENING CLIP

(75) Inventors: Victor Diez Herrera, Barcelona (ES); Isaac Tejero Salinero, Barcelona (ES)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 13/577,940

(22) PCT Filed: Feb. 15, 2011

(86) PCT No.: PCT/US2011/024838
§ 371 (c)(1),
(2), (4) Date: Aug. 9, 2012

(87) PCT Pub. No.: WO2011/103068
PCT Pub. Date: Aug. 25, 2011

(65) Prior Publication Data
US 2012/0305724 A1 Dec. 6, 2012

(30) Foreign Application Priority Data
Feb. 16, 2010 (ES) .................................. 201000203

(51) Int. Cl.
*F16B 21/00* (2006.01)
*F16B 21/07* (2006.01)
*B60N 3/02* (2006.01)

(52) U.S. Cl.
CPC .............. *F16B 21/075* (2013.01); *B60N 3/026* (2013.01)

(58) Field of Classification Search
USPC ........ 248/74.1, 74.2, 75.5, 71, 231.81, 316.7; 24/293, 295, 297; 174/72 A
See application file for complete search history.

(56) References Cited

U.S. PATENT DOCUMENTS

| | | | | |
|---|---|---|---|---|
| 5,636,891 | A * | 6/1997 | Van Order et al. ............ | 296/37.7 |
| 6,141,837 | A * | 11/2000 | Wisniewski ................... | 24/295 |
| 6,178,605 | B1 | 1/2001 | Romero Magarino et al. | |
| 6,381,811 | B2 * | 5/2002 | Smith et al. ................... | 24/289 |
| 6,460,813 | B1 * | 10/2002 | Gretz .............................. | 248/62 |
| 6,691,380 | B2 * | 2/2004 | Vassiliou ........................ | 24/295 |
| 7,051,408 | B2 * | 5/2006 | De Azevedo et al. .......... | 24/295 |
| 7,676,893 | B2 * | 3/2010 | Gibbons et al. ................ | 24/295 |

(Continued)

FOREIGN PATENT DOCUMENTS

| | | |
|---|---|---|
| CN | 1224390 A | 7/1999 |
| EP | 0 743 461 A1 | 11/1996 |

(Continued)

OTHER PUBLICATIONS

An International Search Report dated Nov. 23, 2011 in International Application No. PCT/US2011/024838.

*Primary Examiner* — Steven Marsh
(74) *Attorney, Agent, or Firm* — Lowe Hauptman & Ham LLP

(57) ABSTRACT

Quick fastening clip, such as those used in the motor vehicle industry, having formed therein, extending from a vault-like surface, legs which by means of a fold are folded in the form of an internal extension, forming, when both of them on each side are joined together, the contact point for a retaining sill; having flanges inclined so as to be directed approximately towards the centre of said bottom surface; flexible wings are provided, being formed by means of a fold which creates a surface, and, by means of another fold which extends into a descending vertical zone, a through-opening with approximately vertical access is created by means of a band which protrudes transversely from said descending surface.

8 Claims, 3 Drawing Sheets

(56) References Cited

U.S. PATENT DOCUMENTS

| | | | |
|---|---|---|---|
| 8,370,999 B2 * | 2/2013 | Camus | 24/295 |
| 2002/0194710 A1 * | 12/2002 | Dickinson et al. | 24/295 |
| 2005/0028323 A1 | 2/2005 | Meyer et al. | |
| 2008/0265627 A1 | 10/2008 | Bodirsky et al. | |
| 2008/0289155 A1 * | 11/2008 | Kim et al. | 24/295 |

FOREIGN PATENT DOCUMENTS

| | | |
|---|---|---|
| ES | 2 138 528 A1 | 1/2000 |
| FR | 2 855 568 A1 | 12/2004 |
| GB | 2461111 A | 12/2009 |

* cited by examiner

QUICK FASTENING CLIP

RELATED APPLICATIONS

The present application is based on International Application No. PCT/US2011/024838, filed Feb. 15, 2011 and claims priority from Spanish Application Number P 201000203, filed Feb. 16, 2010.

FIELD OF THE INVENTION

The present invention relates to a clip such as those which are used in the motor vehicle industry mainly for fixing self-supporting parts to vehicle panels, having the particular feature that the ease of mounting and removal thereof has been optimized by means of its constructional design.

PRIOR ART

The clips referred to in the paragraph above are widely used in the industry. A large number of them are used during the assembly of a motor vehicle. Moreover, when necessary, for example during repairs, it is often required to remove some or all of the vehicle parts which are mounted by said type of clip. In short, the ease of mounting and, where required, removal of said clips and the parts they support is of a certain importance for the industry.

It is known from the European Patent EP 0743461 to provide a clip and fixing stud, where the former has wings intended to engage inside cavities present in the stud, when the latter is introduced entirely inside the clip, producing relative locking together. The shank or stud has a through-cavity inside which a tool may be inserted in order to separate the wings of the clip, thus releasing the relative engagement.

The clip described, in its simplicity, illustrates the general principles used in the prior art for this type of fixing system: there exists a part, i.e. the clip, which is introduced through the opening in the panel and which has means for engagement with said panel, in this case the folded ends of its wings, and other means for locking the retaining shank or stud, in this case cavities in the stud with which the middle folded zones of said wings engage.

One of the main objects of the present invention is to allow assembly, in two stages, where during a first stage the retaining shank and clip are provisionally assembled together and then the assembly is introduced inside the panel opening.

Another of the main objects of the present invention is to improve the ease of insertion and removal, both of the retaining shank inside the clip and of the assembly inside the panel opening.

Another of the objects. of the present invention is to minimize the number of friction zones in the clip, once installed, so as to avoid as far as possible noise resulting from vibration of the vehicle.

These and other objects of the present invention will become clear during the course of the description thereof provided below.

BRIEF DESCRIPTION OF THE INVENTION

The present invention relates to a clip such as those which are used in the motor vehicle industry mainly for fixing self-supporting parts to vehicle panels where a rounded base has, extending therefrom, legs which, folded, provide the means for fixing a retaining stud or shank as well as flexible wings which incorporate a surface for fixing to the panel.

The clip has a vault-like general appearance, its approximately conical configuration allowing it to be inserted more easily inside the respective opening of the vehicle panel.

In this clip the parts for fixing the retaining shank, present in said legs of said clip, have been optimized both in order to facilitate the entry of said shank into the clip as well as to ensure retention thereof with a minimum number of retention contact zones.

Moreover, the flexible wings responsible for performing fixing in the panel have a broader surface for improving said function as well as a cavity with a contact zone for application of a tool when removing the clip from the panel.

BRIEF DESCRIPTION OF THE DRAWINGS

In order to facilitate understanding of the invention the latter is accompanied by three sheets of drawings solely by way of a non-limiting example of said invention.

DETAILED DESCRIPTION OF THE INVENTION

Figure 1:
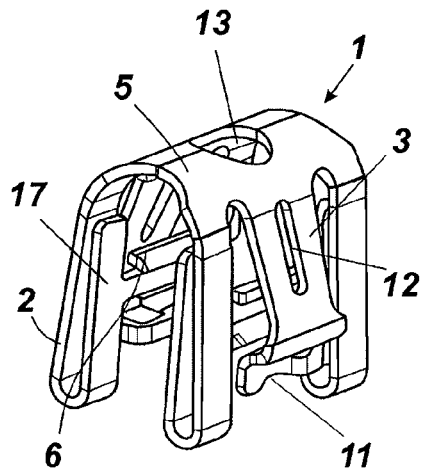
FIG. 1 shows a perspective view of a preferred embodiment of the clip according to the present invention.
Figure 2:
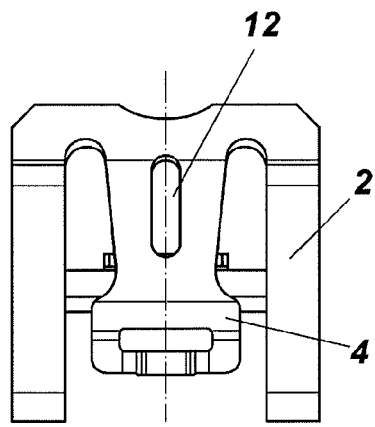
FIG. 2 shows an elevation view of the clip according to the preceding figure.
Figure 3:
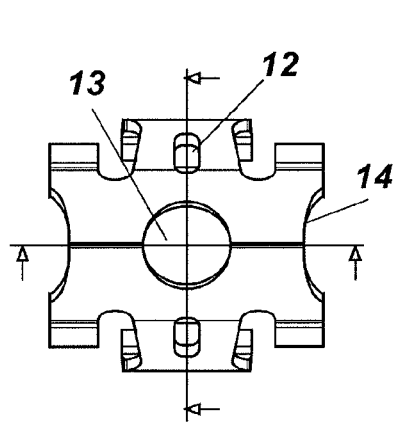
FIG. 3 shows a top plan view of the clip according to the preceding figures.
Figure 4:
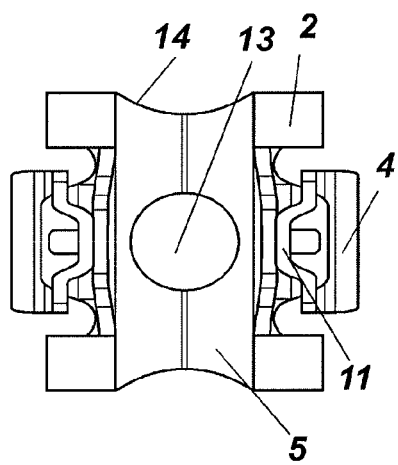
FIG. 4 shows a bottom view of the clip according to the preceding figures.
Figure 5:
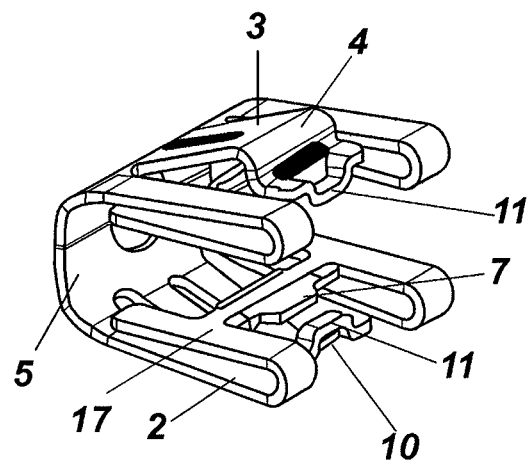
FIG. 5 shows a perspective view of the clip of the preferred embodiment of the invention, being shown in a tipped over position so that the details of its bottom part can be seen more clearly.
Figure 6:
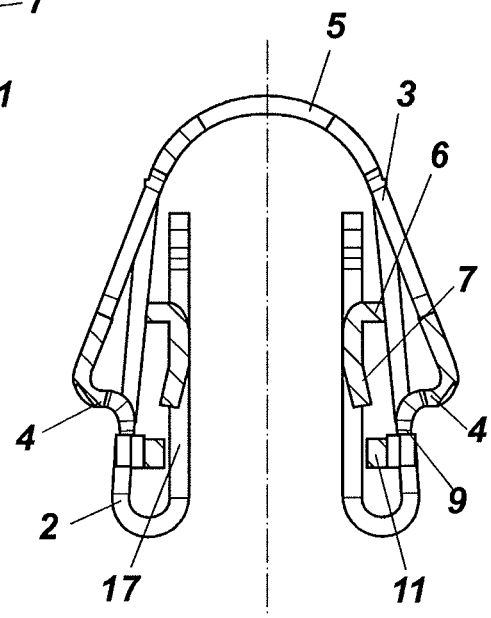
FIG. 6 shows a cross-sectional view of FIG. 3.
Figure 7:
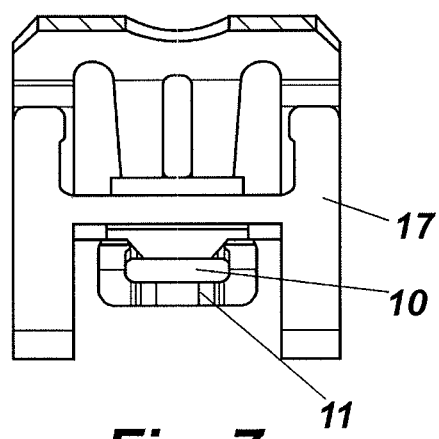
FIG. 7 is a middle section through the clip according to FIG. 2, showing the flank of the clip viewed from the inside thereof.
Figure 8:
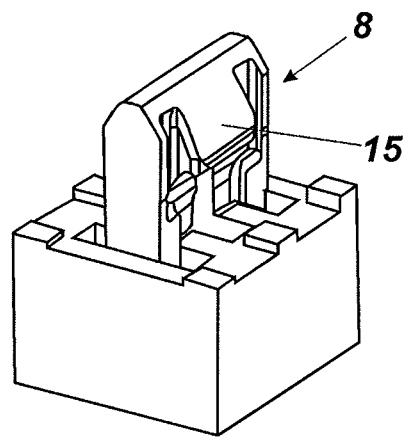
FIG. 8 shows a perspective view of one of the possible embodiments of the retaining shank to be fixed inside the clip according to the invention.
Figure 9:
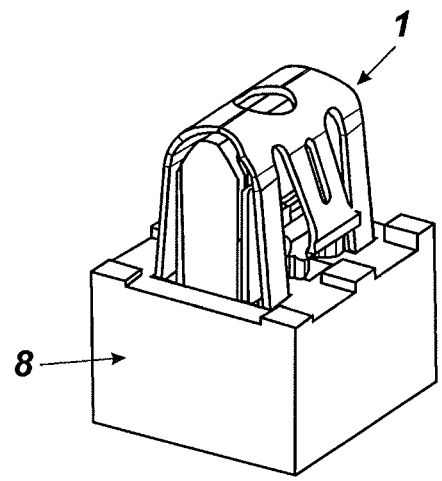
FIG. 9 shows a perspective view of the assembly consisting of clip together with the retaining shank.

The present invention consists of a quick fastening clip (1), such as those used in the motor vehicle industry for mounting, mainly, self-supporting parts on vehicle panels, incorporating legs (2) which include the elements for performing fixing between a retaining shank (8) and said clip (1) as well as flexible wings (3) which incorporate the means for retaining the clip on the panel, said surface means (4) of said flexible wings (3) making contact with said panel, in which an approximately rectangular vault-like surface (5) with an accentuated curvature has, extending therefrom, said legs (2) which by means of a fold are folded towards the inside of the clip in the form of extensions (17) so as to form, when both of said internal extensions (17) on each side are joined together, a retaining sill (6).

The bridge piece of said internal extensions (17) also has respective flanges (7) which are inclined so as to be directed approximately towards the centre of said bottom surface (5). These flanges ensure guided and gradual entry of the retaining shank (8), the head (16) of which, having an approximately conical form viewed in cross-section, passes owing to its inclined entry surface (15) with a sliding movement through said flanges (7) along its path until it is fully inserted in the clip (1), splaying the legs (2) and in fact facilitating its insertion.

Figure 10:
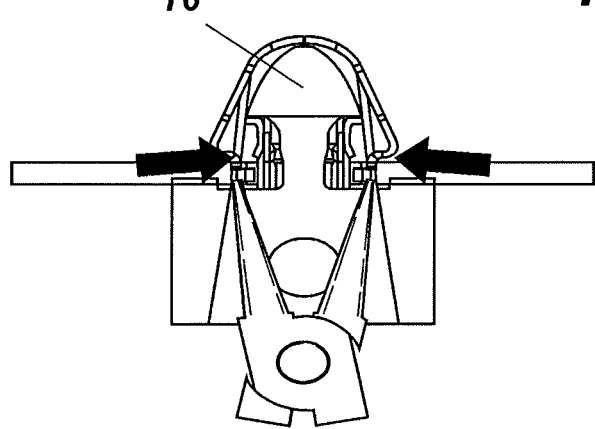
FIG. 10 shows a cross-sectional view of a clip mounted in a panel incorporating its retaining shank, where the tool is ready to release the clip from the panel.

The function of said retaining sills (6) is to perform a ratchet action against the bottom part of the head (16) of the stud of said retaining shaft (8), as shown in the cross-section of FIG. 10.

As mentioned previously, the constructional form of the parts described is intended especially to facilitate introduction of the shank (8) inside the clip (1), minimizing the zones of the mutual contact which cause engagement thereof.

In another of the aspects of the present clip (1), the flexible wings (3), which are responsible for fixing the clip (1) to the panel, are formed by means of a fold which creates a surface (4), said broadened surface allowing, by means of another fold which extends into a descending vertical zone (9), the creation of a through-opening (10) for inserting a tool for releasing the clip from the panel.

Said access opening (10), which is approximately vertical, is formed in the preferred embodiment of the invention by means of a band (11) which protrudes transversely from said surface (9). The result of said structure is that, when the clip (1) is disassembled from the panel, the tip of a tool is introduced through said opening (10). When the tips of said tool are closed and pressed against said bands (11), the flexible wings (3) are contracted towards the inside of the clip (1) and said surfaces (4) are disengaged from the edge of the panel opening inside which the clip is inserted, releasing the connection.

The wings of the clip (1) are provided with grooves (12) in order to lighten the material thereof. With the same aim, the rounded surface (5) has depressions (14) along its sides and a central hole (13) which additionally allows easy centring of the part during processing thereof.

It is understood that the constructional details and form of the present invention may be varied provided that they do not modify the basic idea of the invention.

The invention claimed is:

1. A quick fastening clip for use in a motor vehicle industry for mounting self-supporting parts on vehicle panels, the quick fastening clip comprising:

legs for performing fixing between a retaining shank of the vehicle panels, flexible wings for retaining the quick fastening clip on the panel, said flexible wings having a surface portion being in contact with said panel, and an approximately rectangular vault-like surface with an accentuated curvature having, extending therefrom, said legs folded in the form of an internal extension of each leg towards said vault-like surface so as to form a retaining sill when respective internal extensions on each side are joined together, wherein said internal extensions of said legs include respective flanges which are inclined so as to be directed approximately towards the center of a bottom surface of said vault-like surface;

wherein said flexible wings are folded to form a broadened contact area which extends into a descending vertical zone defining an access opening therein, with approximately vertical access, configured to allow insertion of a tool for disengaging the clip from the panel; and wherein said access opening, which is approximately vertical, is formed by a band which protrudes transversely from said descending vertical zone.

2. The quick fastening clip as claimed in claim 1, wherein said vault-like surface has a central hole.

3. The quick fastening clip as claimed in claim 1, wherein said vault-like surface has lateral depressions.

4. The quick fastening clip as claimed in claim 1, wherein each of said wings defines a groove therein.

5. The quick fastening clip as claimed in claim 1, wherein folds of the respective legs that establish the internal extensions are located at the most distal portion of the clip relative to the vault-like surface.

6. The quick fastening clip as claimed in claim 1, wherein all of the internal extensions are parallel to one another when the clip is in a relaxed state.

7. The quick fastening clip as claimed in claim 1, wherein said vault-like surface is laterally centered at a longitudinal axis of the clip.

8. The quick fastening clip as claimed in claim 1, wherein said vault-like surface is a surface from which all legs and all wings extend in a symmetrical manner.

* * * * *